Feb. 24, 1931.  O. M. FREDD  1,793,473
TIRE MOLD CONSTRUCTION
Filed Nov. 21, 1927
Fig. 1
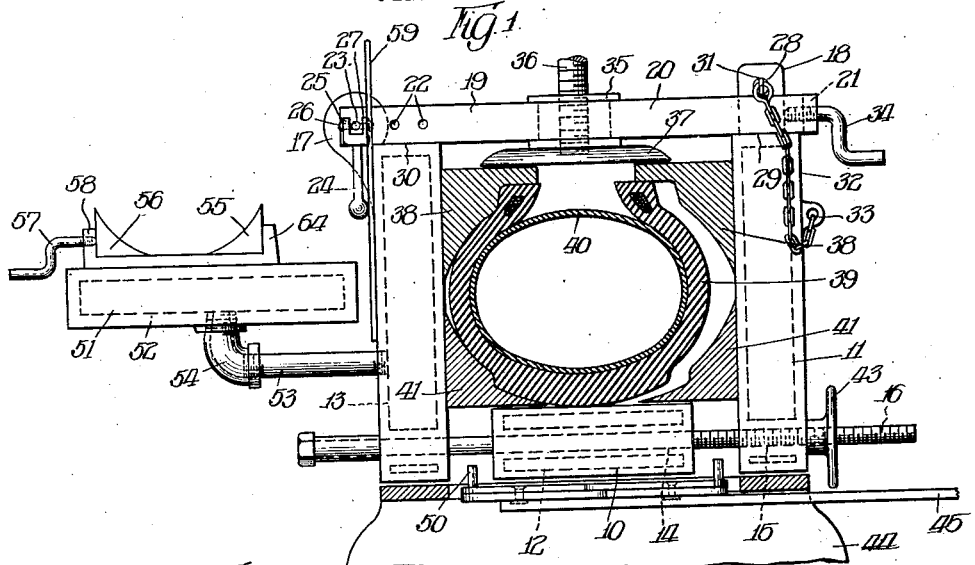
Fig. 2
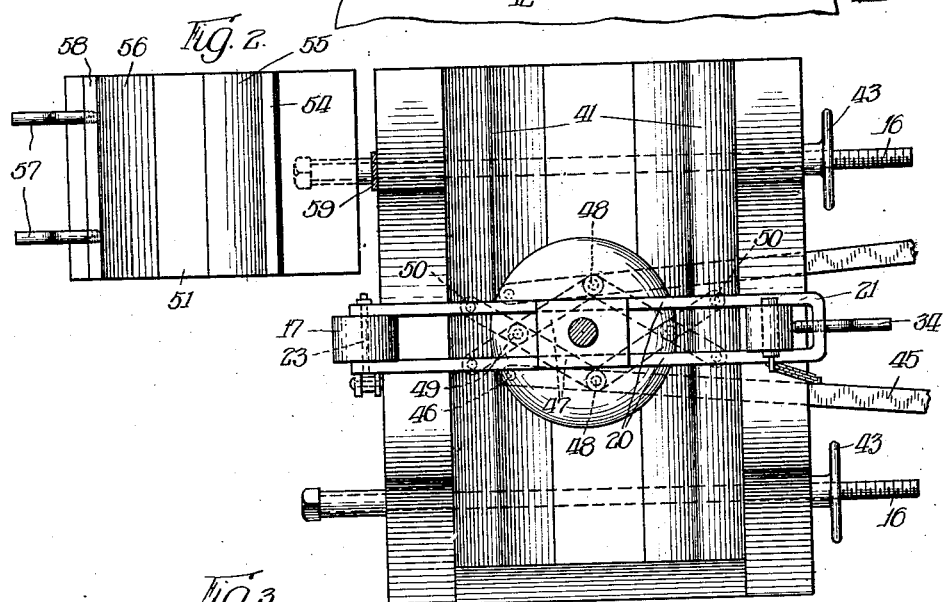
Fig. 3
Fig. 4
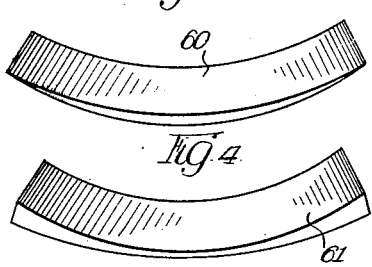
Fig. 5
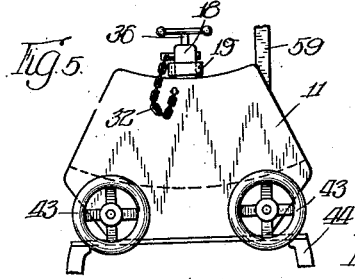
Witness:
P. Burkhardt.
Inventor:
Oscar M. Fredd,
By Wilkinson, Huxley, Byron & Knight
Attys.

Patented Feb. 24, 1931

1,793,473

UNITED STATES PATENT OFFICE

OSCAR M. FREDD, OF HANCOCK, MICHIGAN

TIRE-MOLD CONSTRUCTION

Application filed November 21, 1927. Serial No. 234,576.

This invention pertains to vulcanizers, and more particularly to a device for securing and imparting thermal changes to compositions, as rubber in tires or the like, especially in repair operations.

In vulcanizing or like operations, it is the usual practice to provide forms to cooperate with the part of the article to be operated on, which forms must be held in fixed position for a certain period, subject oftentimes to thermal changes. It is highly desirable in providing devices to perform this function, especially in the case of vulcanizing automobile tires, to provide supporting means which will securely clamp the molding means in place, which device per se provides means for imparting temperature changes to the mold, yet a device which may be readily disassembled after the operation has been completed.

It is therefore an object of this invention to provide a device for securing tires or the like whereby adjustment may be made to accommodate various sizes of articles.

Another object is to provide a device whereby ready assembly and disassembly may be effected as well as ease and quicker operation.

A further object is to provide a device capable of thermally affecting the article operated on and one which is complete per se without the necessity of packing strips or fillers.

Still further object is to provide an inexpensive yet effective vulcanizing device which will fulfill all requirements of manufacture and service.

With these and various other objects in view, the invention consists of certain novel features of construction and operation as will be more fully described and particularly pointed out in the specification, drawings and claims appended hereto.

In the drawings, wherein like reference characters are used to designate like parts—

Figure 1 is a side elevation of the assembled vulcanizing frame embodying the invention;

Figure 2 is a top plan view of the device shown in Figure 1;

Figure 3 is a radius changing plate for treads of increasing effective tire diameter;

Figure 4 is a radius changing plate for treads of decreasing effective tire diameter; and Figure 5 is a fragmentary side elevation of the assembly of one form of vulcanizing apparatus for only a segment of a tire.

The device may take the form of a base member 10 which may be secured in any convenient manner to any number (shown two) of side supports 11. It has been found desirable to provide both the base member 10 and the side supports 11 with heating means, either electrical, steam, etc., and in this case both members are shown provided with cores 12 and 13, respectively, to which steam may be introduced and drawn off in any convenient manner. In such a case, bosses or channels 14 and 15 may be provided in the base and side supports for the reception of a threaded tie rod support 16 extending therethrough. The side supports 11 are provided with aligned lugs 17 and 18 on different supports for the purpose of securing the yoke 19 to said supports.

The yoke may conveniently take the form of a U-shaped member provided with legs 20 and a connecting member 21, the legs adjacent the free ends being provided with a plurality of apertures 22 for the purpose of the reception of a locking bolt 23 adapted to extend through both legs of the lug 17, suitable fastening means such as a nut (not numbered) being applied to the threaded end thereof. The headed end may be provided with a pivoted locking lever 24 provided with bifurcated jaws 25 for the reception of a pin 26 pivoting said jaws to the head of the bolt. The jaws of said lever, it will be seen, are provided with projecting portions 27 extending beyond the diameter of the head of the bolt, forming in effect wedging cams, so that it is only necessary to revolve the lever 24 around its pivotal connection 26 to thereby force the legs of the yoke toward the lug 17, tightly positioning said yoke with respect to said lug.

Lug 18 is provided with an aperture 28 disposed above the yoke 21, in its support engaging position along faces 29 and 30 of the supports 11, said aperture being adapted to receive a locking pin 31 which may conveniently be secured to lug 33 of its support 11 through flexible connection or chain 32. The connecting portion 21 of the yoke may be threaded for the reception of a correspondingly threaded crank 34, the end of which has engagement with a portion of the lug 18 so that the yoke may be tightly wedged with respect to said lug and its support 11. This yoke carries a slidable nut 35 adapted to receive the threaded portion 36 of the press member 37. The press member, it will be seen, has engagement with beads 38 provided as formers for the tire 39 to be vulcanized, which may be reinforced by the former 40, such as particularly described in my co-pending application Serial No. 226,566 filed November 21, 1927.

The bottom part of the tire is supported on treads 41 which may rest directly on the base 10, engagement with supports 11 being adjusted with respect to the tire by means of the hand-wheels 43 provided on the tie rods 16. A supporting frame 44 may be provided for the device, said frame having levers 45 pivoted thereto as at 46, a pantograph 47 being conveniently pivoted to said levers as at 48, the links of the pantograph being pivoted in pairs as at 49 and extending beyond said pivots a distance, said extensions being provided with upstanding lugs 50 adapted to be positioned between the base 10 and the side supports 11 so that it will be seen that when the device is to be disassembled, it is only necessary to disengage the yoke from the side supports and loosen the securing means 16—43, whereupon the handles 45 may be moved toward each other, tending to elongate the links in the direction of the length of the handles, thereby spreading the side supports with a minimum effort so that the remainder of the device may be readily disassembled.

At this point it may be well to note that though a device for vulcanizing only a part of a tire has been described, one which completely encircles the tire or one which is adaptable for a plurality of tires may utilize the principles herein described. For instance, it would only be a matter of construction to make a device wherein the sides 11 are the size of a tire, any supporting means for the beads and/or treads being used between the inside of the tire, the beads and/or treads being either a built up circle or an integral circle. Further, only one side of the device may be made adjustable as the base 10 and a side 11 may be made integral, giving an L-shaped structure for these parts. Or, a built up U-shape or box structure may be readily made. And it is equally possible to form treads and beads integral with base or supports or to core such plates and provide fittings to introduce heat directly thereto.

It has been found convenient to associate the tread spotter 51 with one support 11. Said spotter consists essentially of a cored supporting member 52 preferably connected to the support 11 through a heat conduit 53 and proper fittings 54. It will be appreciated that the member 52 may be of any desired shape, i. e., table shaped (as shown), or L-shaped or U-shaped or box shaped, depending upon whether it is desired to introduce heat to the tread plates from more than one direction. In the case of U-shaped, box, etc., it will be understood that certain of the sides may be movable to follow movable tread plates or to accommodate different size tread supports. With a shaped member 52 too, it may be possible to eliminate tread plates supports as the combined heating and adjusting function may be accomplished by the support per se. This spotter to be used for vulcanizing a separate tire from that being vulcanized in the apparatus proper and especially for small portion jobs, is provided with a clamping device consisting of a base or support 64 having a short section of tread plates 55 and 56 thereon, one of said plates (shown at 56) being adapted to be moved with respect to the base by any means such as the cranks 57, suitably threaded on an upstanding shoulder 58 of the base. An upright tire supporting brace 59 may conveniently be provided on the tread spotter supporting member 11 adjacent said spotter, the same being equipped with a chain or any other flexible member (not shown) for positioning the tire in the spotter.

In operation then of the device, it is only necessary to assemble the base and side supports 10 and 11 with respect to the support 44 and the pantograph, placing the formers (beads and treads) in proper relation with respect to the tire 39 with its former 40. The securing means 16 is then tightened, the yoke 19 is placed in proper position, securing said yoke by means of the lever 24, crank 34 and pin 31, after which the press 37 may be actuated to apply proper pressure to the frames. If during the vulcanizing operation it is desired to heat the formers, steam or any other medium may be simply introduced into the cores of the base and/or the supports. After the vulcanizing operation is completed, the device may be disassembled as already indicated.

If it is desired to use the device for a different sized tire than that adapted to be accommodated by the tread 41 already in the device, it is only necessary to remove said treads, placing in their stead either of the radius changes 60 or 61, depending upon whether the tire to be operated upon is of larger or smaller diameter than that accommodated by the previous tread plates. New tread plates may then be introduced on top of these radius changing plates, said tread plates corresponding to the curvature of these radius changing plates, and the device is then ready for use. With such an arrangement, it will be appreciated that with a few tread plates and a few radius changing plates, the device may be accommodated to any size tires.

In operation of the tread spotter, the same may be readily used while the device proper is in use, another tire being merely positioned on the tread plates 56 supported thereon by the support 59 and its associated flexible member, these tread plates 56 of which may merely be sections of or similar to tread plates 41, or may conveniently be waste sections of the circles of metal from which the said tread plates 41 are made.

It is to be understood of course that I do not wish to be limited by the exact embodiment of the device shown, which is merely by way of illustration and not limitation, as various and other forms of the device will of course be apparent to those skilled in the art.

I claim:

1. In a device of the character described, the combination of supporting members, base means associated therewith, tread and bead blocks associated with said base means, pressing means, and a clamping bar adjustably supporting said pressing means and cooperating in a plurality of positions with said supporting members for cooperating with said blocks, said bar being adjustable at each end thereof to uniformly move said blocks toward each other.

2. In a vulcanizing device, the combination of oppositely disposed heating chambers, a heating chamber disposed therebetween to thereby form a support for tread means, tread means for receiving a tire, members cooperating with said chambers for moving the oppositely disposed chambers to thereby move said tread means, a clamping bar disposed at a point remote from said members, said clamping bar being provided with means for moving said chambers, said clamping bar being provided with means for effecting clamping adjustment thereof, a member carried by said clamping bar for moving said tread means, and a heat receiving chamber cooperating with one of said first named chambers, said chamber being provided with a device having tread plates, said device having an adjustable member whereby the position of said tread plates may be varied.

3. In a vulcanizing device, the combination of oppositely disposed heating chambers, a heating chamber disposed therebetween to thereby form a support for tread means, tread means for receiving a tire, members cooperating with said chambers for moving the oppositely disposed chambers to thereby move said tread means, a clamping bar disposed at a point remote from said members, said clamping bar being provided with means for moving said chambers, said clamping bar being provided with means for effecting clamping adjustment thereof, a member carried by said clamping bar for moving said tread means, and additional means including members cooperating with said first named chambers operable to move said chambers upon release of said first named members and clamping bar.

4. In a vulcanizing device, the combination of oppositely disposed heating chambers, a heating chamber disposed therebetween to form a support for tread members, tread members for receiving a tire, and members having a portion corresponding to said second named heating chamber and another portion for engaging said tread members to thereby support said tread members in positions of selected changed tire radii.

5. In a vulcanizing device, the combination of oppositely disposed heating chambers, a heating chamber disposed therebetween to thereby form a support for tread means, tread means for receiving a tire, means insertable in said device to cooperate with said tread means for changing the tire radii thereof, members cooperating with said chambers for moving the oppositely disposed chambers to thereby move said tread means, a clamping bar disposed at a point remote from said members, said clamping bar being provided with means for moving said chamber, said clamping bar being provided with means for effecting clamping adjustment thereof, and a member carried by said clamping bar for moving said tread means.

6. In a vulcanizing device, the combination of oppositely disposed clamping members, a heating chamber disposed therebetween to form a support for tread members engaging said clamping members, tread members for receiving a tire, and members having a portion corresponding to said heating chamber and another portion for engaging said tread members to thereby support said tread members in positions of selected changed tire radii.

Signed at Hancock, Michigan, this 16th day of November, 1927.

OSCAR M. FREDD.